United States Patent [19]

Obana et al.

[11] Patent Number: 5,317,624
[45] Date of Patent: May 31, 1994

[54] CORDLESS AUTOMATIC ANSWERING TELEPHONE SET

[75] Inventors: Noboru Obana, Machida; Mitsuo Satoh, Kawasaki, both of Japan

[73] Assignee: Matsushita Electric Industrial Co., Ltd., Osaka, Japan

[21] Appl. No.: 715,807

[22] Filed: Jun. 14, 1991

[30] Foreign Application Priority Data

Jun. 18, 1990 [JP] Japan .................................. 2-159045

[51] Int. Cl.⁵ ...................... H04M 11/00; H04M 1/64
[52] U.S. Cl. ........................................ 379/61; 379/67; 379/88
[58] Field of Search ....................... 379/58, 61, 67, 88; 455/56.1

[56] References Cited

U.S. PATENT DOCUMENTS

| | | | |
|---|---|---|---|
| 4,677,655 | 6/1987 | Hashimoto | 379/61 |
| 4,794,636 | 12/1988 | Sanglier et al. | 379/62 |
| 4,881,259 | 11/1989 | Scordato | 379/67 |
| 4,926,421 | 5/1990 | Kawano et al. | 379/63 |
| 5,081,668 | 1/1992 | Ito | 379/58 |

FOREIGN PATENT DOCUMENTS 64-51852 2/1989 Japan .
1-253355 10/1989 Japan .

Primary Examiner—Stephen Chin
Assistant Examiner—Vijay Shankar
Attorney, Agent, or Firm—Mason, Fenwick & Lawrence

[57] ABSTRACT

A cordless automatic answering telephone set includes a base station that guides terminal-designation-call codes of the base station and a mobile station associated with the base station, and each of base station and the mobile station can send outgoing messages and record incoming messages. The cordless automatic answering telephone is superior in that the privacy of the user of each of the base and mobile stations can be protected, and the user of each of the base and mobile stations can utilize a selective response function for making a response only to a special person who knows the control signal.

4 Claims, 5 Drawing Sheets

CORDLESS AUTOMATIC ANSWERING TELEPHONE SET

BACKGROUND OF THE INVENTION

The present invention relates to a cordless automatic answering telephone set, and particularly relates to a cordless automatic answering telephone set in which a base station has a function as a telephone set and an answering function to send out a response message (i.e., out going message or so-called OGM) automatically in response to a call from a caller and record the business or message of the caller (i.e., incoming message or so-called ICM).

Such a conventional cordless automatic answering telephone set has a configuration in which both a basic station and a mobile station can output a ringing tone in response to a call from a caller at the same time and either can send out a response, or if neither send out a response, the basic station will send out a response message in automatic response and record the caller's message.

In the above-mentioned conventional cordless automatic answering telephone set, however, in the case where different users use the set in the basic station and the mobile station, a caller cannot call only one of the users of the basic station and the mobile station, and there has been therefore a problem that when the user of one station has responded to the call for the other station, the user of the one station has to perform troublesome matters, for example, to make telephone transfer to the other station, or to jot down a memorandum about the incoming message when the other station user is absent.

In addition, since the business is recorded only in the base station in such a case the called user is absent, there has been a problem that others can hear the incoming message which is wanted not to be known to users of other stations.

SUMMARY OF THE INVENTION

It is therefore an object of the present invention to solve the foregoing problems in the conventional cases so that the privacy of users of a basic station and a mobile station can be protected.

It is another object of the present invention to provide an improved cordless automatic answering telephone set by which respective users of a basic station and a mobile station can use a selective response function to make a response to only special persons who know a control signal.

In order to attain the first object of the present invention, the cordless automatic answering telephone set has a feature that the telephone set comprises a terminal-designation-call guidance means for guiding terminal-designation-call codes of a basic station and a mobile station, and a terminal-designation-call code detection means for detecting the terminal-designation-call codes, so that a caller can select and call only one of the basic station and the mobile station. In addition, the telephone set may further comprise an out-going message send-out means and an incoming message recording means in each of the basic and mobile stations so that it is possible that even when either one of the base and mobile stations which is called by a caller does not issue a response to the call, the caller's incoming message can be recorded only in the called station.

According to the present invention, therefore, since it is possible for a caller to easily select and call only one of the base station and the mobile station, there is no fear that a user of the other station makes a response to the call, and in addition, since a caller's incoming message is recorded in a called station when the user of the called station is in absence, there is no fear that the caller's incoming message is heard by the user of other station.

In addition, in order to attain the foregoing second object, a terminal-designation code for designating a terminal of either one of the base station and the mobile station is added after a control signal for outputting a special ringing tone, and a terminal-designation code detection means is provided, so that a caller can select and call only a terminal of either one of the base station and the mobile station. As the control signal, for example, a DTMF signal may be used.

According to the present invention, therefore, if a special person is informed of a control signal for outputting a special ringing tone and a terminal-designation code in advance, it is possible for a user of a station to make a response only when the special ringing tone is outputted so that the user can respond to a call from the special person, and the existence of the special person can be prevented from being known to the user of the other station. In addition, by using a DTMF signal as the control signal, it is possible to constitute the terminal-designation code detection means easily.

DESCRIPTION OF THE PREFERRED EMBODIMENTS

Figure 1:
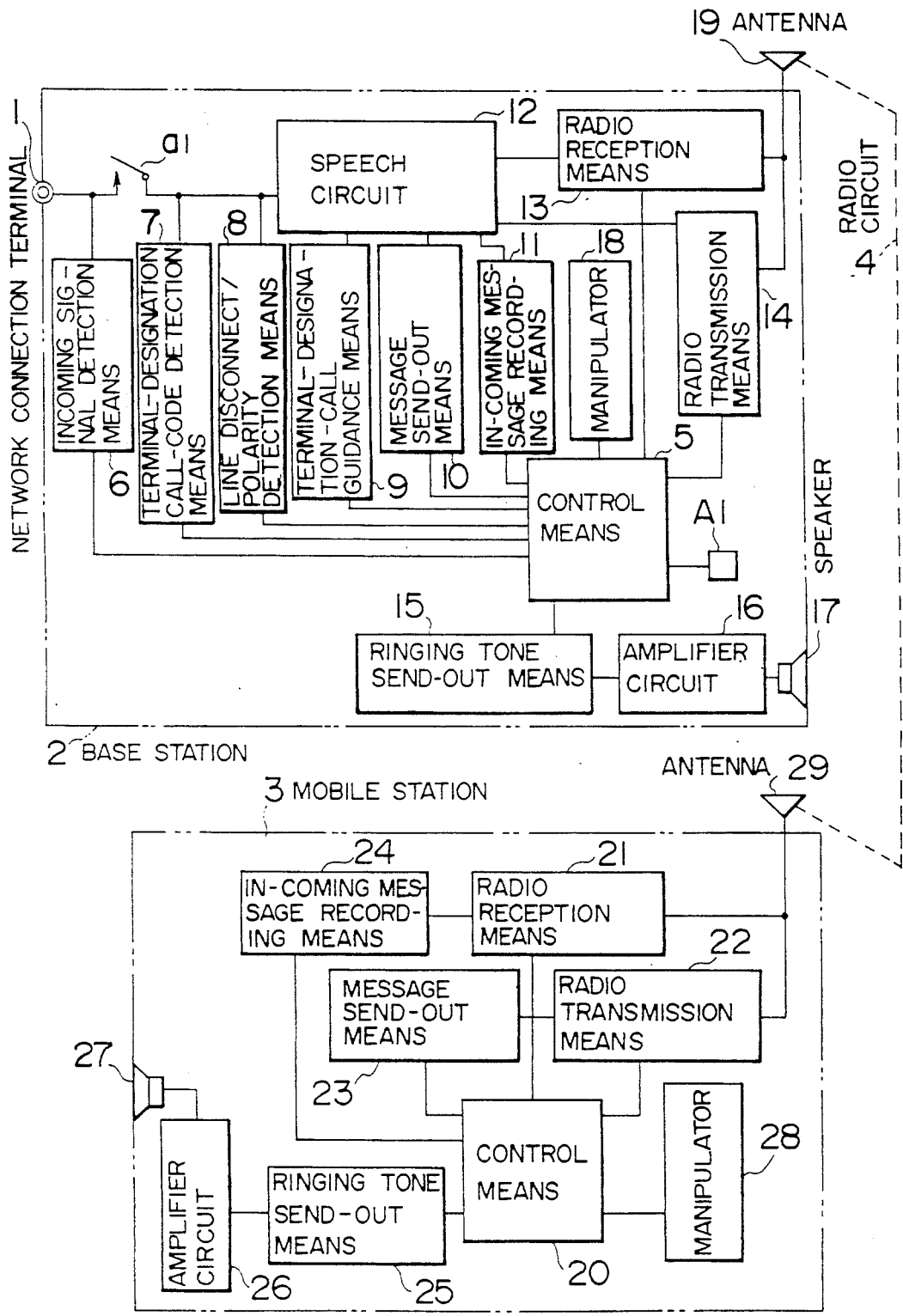
FIG. 1 is a schematic diagram illustrating the configuration of a cordless automatic answering telephone set in a first embodiment of the present invention.

FIG. 1 shows the configuration of a first embodiment of the present invention. In FIG. 1, the reference numeral 1 represents a network connection terminal for connecting the telephone set to a telephone circuit, 2 represents a base station connected to the telephone circuit through the network connection terminal 1, 3 represents a mobile station to be connected to the base station through radio, 4 represents a radio circuit for connecting the base station 2 and the mobile station 3 to each other, 5 represents a control means for the base station 2 and constituted by a microcomputer, 6 represents an incoming signal detection means, 7 represents a terminal-designation-call code detection means for detecting a terminal-detection-call code sent from a caller, 8 represents a clearing-out (i.e., line disconnect/polarity) detection means, 9 represents a terminal-designation-call guidance means for guiding terminal-designation-call codes of the base station 2 and the mobile station 3, 10 represents a response (outgoing message) send-out means of the base station 2 for sending out an outgoing message, 11 represents an incoming message recording means of the base station 2 for recording caller's message, 12 represents a speech circuit for the telephone circuit, 13 represents a radio reception means of the base station 2, 14 represents a radio transmission means of the base station 2, 15 represents a ringing tone send-out means of the base station 2 for informing that an incoming signal has been sent through the circuit, 16 represents an amplifier circuit, 17 represents a speaker, 18 represents a manipulator of the base station 2, 19 represents an antenna of the base station 2, 20 represents a control means for the mobile station 3 and constituted by a microcomputer, 21 represents a radio reception means of the mobile station 3, 22 represents a radio transmission means of the mobile station 3, represents a response send-out means of the mobile station 3 for sending out a response message, 24 represents an incoming message recording means of the mobile station for recording caller's message, 25 represents a ringing tone send-out means of the mobile station 3 for informing that an incoming signal has been sent through the circuit, represents an amplifier circuit, 27 represents a speaker, 28 represents a manipulator of the mobile station 3, and 29 represents an antenna of the mobile station 3. And Al and al represent a relay and a switching contact thereof for closing a circuit.

Figure 2:
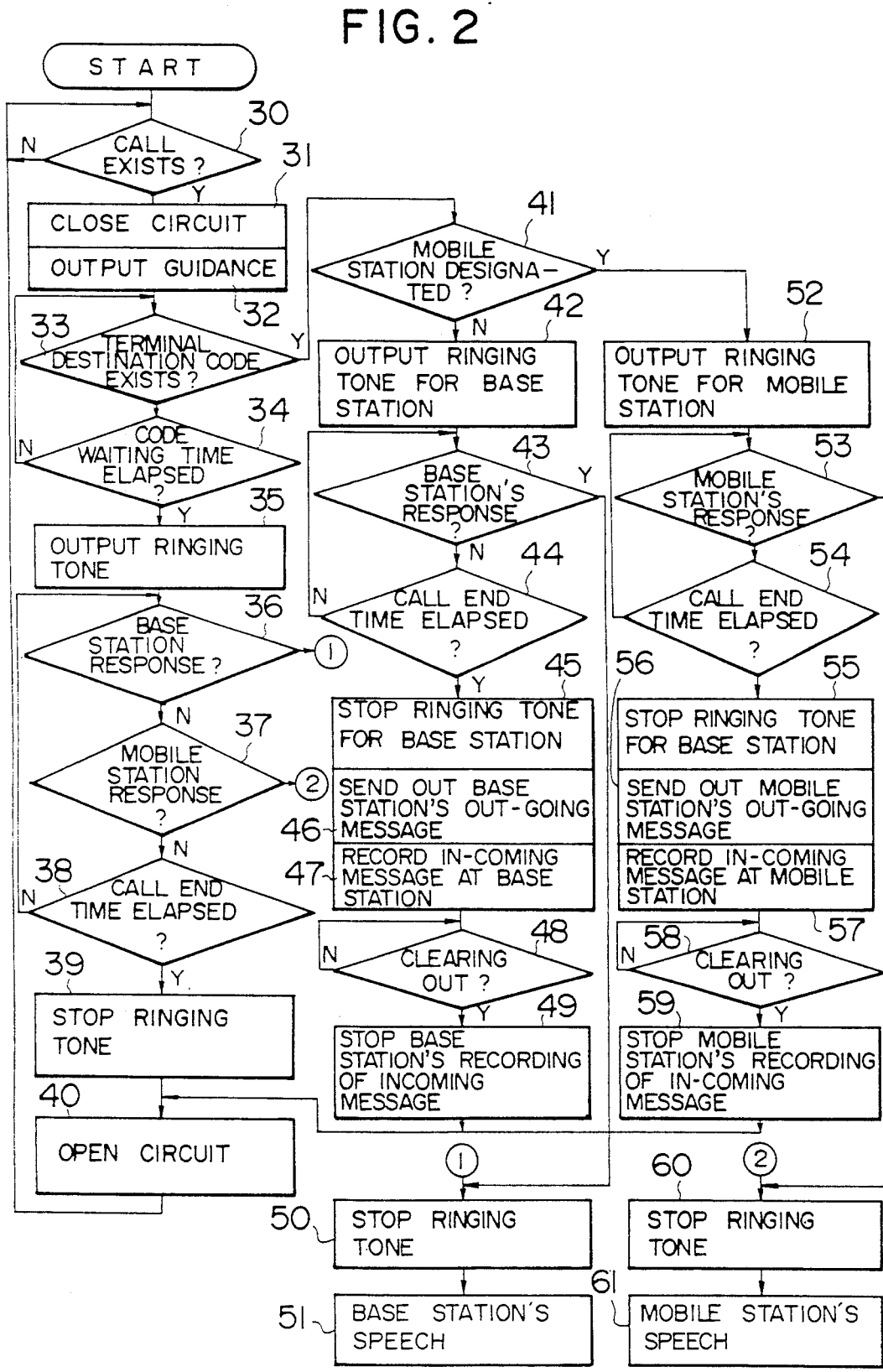
FIG. 2 is a flow chart showing a main operation of a control means used in the same telephone set.

Next the operation of the configuration of FIG. 1 will be described with reference to the flow chart of FIG. 2.

In the above-mentioned embodiment, in a stationary state, the switching contact al of the relay Al is in the state as shown in FIG. 1. Now, in this state, if there occurs a call through the circuit, the call is detected by the incoming signal detection means 6, and the output of the incoming signal detection means 6 indicating the called state is supplied to the control means 5. Upon detection of the input indicating the called state from the incoming signal detection means 6 in a step 30, the control means 5 turns on the relay Al to close the circuit in a step 31, and drives the terminal-designation-call guidance means 9 in a step 32, so that a message for guiding a terminal-designation-call code for selecting either the base station 2 or the mobile station 3 and calling it separately is sent out to the circuit through the speech circuit 12, the switching contact al and the network connection terminal 1.

When this terminal-designation-call guidance is in an outputting state, the control means 5 monitors the output of the detection means 7 in steps 33 and 34. Then, when a terminal-designation-call code from the detection means 7 is not supplied through the terminal-designation-call code wait time has passed, in the step 35, the control means 5 stops or disables the terminal-designation-call guidance means 9 and drives the ringing tone send-out means 15 of the base station 2 to thereby output a ringing tone from the base station 2 through the amplifier circuit 16 and the speaker 17, and drives the radio reception means 13 and the radio transmission means 14 to thereby transmit an incoming command indicating existence of incoming to the mobile station 3. The incoming command is supplied to the control means 20 through the radio transmission means 14, the antenna 19, the radio circuit 4, the antenna 29, and the radio reception means 21. (Hereinafter the communication through this path is referred to as "up communication".) Upon detection of the incoming command from the radio reception means 21, the control means 20 of the mobile station 3 drives the ringing tone send-out means 25 of the mobile station 3. The ringing tone is outputted from the mobile station 3 through the amplifier circuit 26 and the speaker 27.

When the ringing tone is outputted from both the base station 2 and the mobile station 3, the control means 5 monitors the response in the base station 2, the response in the mobile station 3, and the call-termination time in steps 36, 37 and 38, respectively.

If a speech is fed from the manipulator 18 of the base station 2, the control means 5 stops or disables the ringing tone send-out means 15 of the base station 2 to thereby stop the ringing tone and shifts the mode into the speech of the base station 2, and at the same time the control means 5 transmits an end command indicating the termination of the operation in the up communication, thereby stopping the output of the ringing tone in the mobile station 3. Upon reception of the end command, the control means 5 stops the ringing tone send-out means 25 of the mobile station 3 so as to stop the output of the ringing tone in the mobile station 3 (steps 39, 50 and 51).

If a speech is inputted from the manipulator 28 of the mobile station 3, the control means 20 of the mobile station 3 transmits a speech command indicating the existence of speech to the base station 2, and stops the ringing tone send-out means 25 of the mobile station 3 to thereby stop the output of the ringing tone in the mobile station 3. The speech command is supplied to the control means 5 of the base station 2 through the radio transmission means 22, the antenna 29, the radio circuit 4, the antenna 19 and the radio reception means 13. (Hereinafter the communication through this path is referred to as "down communication".) Upon reception of the speech command through the down communication, the control means 5 stops the ringing tone send-out means 15 of the base station 2 to stop the output of the ringing tone in the base station 2 to thereby shift the operation into the speech mode of the mobile station 3 (steps 37, 60 and 61).

If neither the base station 2 nor the mobile station 3 makes a response through the call-end time has elapsed, the control means 5 of the base station 2 stops the ringing tone send-out means 15 of the base station 2 and transmits an end command to the mobile station 3 through the up communication, thereby stopping the output of the ringing tone in the base station 2 and the mobile station 3, and at the same time the control means 5 turns off the relay Al to open the circuit, returning into a state where existence of a call is detected (steps 38, 39 and 40).

In the above-mentioned terminal-designation-call guidance output state (steps 33 and 34), when a terminal-designation-call code is sent from a caller, the detection means 7 detects the terminal-designation-call code and supplies it to the control means 5. Upon detection of a terminal-designation code indicating the selection of the base station, the control means 5 stops the guidance means 9 and drives the send-out means 15 of the base station 2, outputting a ringing tone from the base station 2 through the speaker 17. On the other hand, the control means 5 does not drive the radio transmission means 14 and does not output a ringing tone in the mobile station 3 (steps 33, 41 and 42).

When the ringing tone is being outputted from only the base station 2, the control means 5 monitors the response and the call-end time in the base station 2 in steps 43 and 44.

Upon input of a speech from the manipulator 18 of the base station 2, the control means 5 stops the send-out means 15 of the base station 2 to stop the ringing tone in the base station 2 and shifts the operation into the speech mode of the base station 2 (steps 43, 50 and 51). If there is no response from the base station 2 through the call-end time has elapsed, on the contrary, the control means 5 stops the ringing tone send-out means 15 of the base station 2 and drives the response send-out means 10 of the base station 2 so as to send out an outgoing message to the circuit through the speech circuit 12, the switching contact al and the network connection terminal 1 (steps 44, 45 and 46).

Upon detection of the output from the response send-out means 10 indicating the end of the outgoing message in this outgoing message send-out state of the base station 2, the control means 5 drives the incoming message recording means 11 of the base station 2 in a step 47 so as to record the caller's message on the message recording means 11 through the network connection terminal 1, the switching contact al, and the speech circuit 12.

In this business recording state of the base station 2, the control means 5 monitors the output of the line-disconnect/polarity detection means 8, and upon detection of the output from the detection means 8 indicating a clearing out or line-disconnection, the control means 5 stops the message recording means 11 and turns off the relay Al. As a result, the message recording is ended, the circuit is opened, and the control means 5 returns into the state where the existence of a call is detected (steps 48, 49 and 40).

On the other hand, upon detection of a terminal-designation code indicating the selection of the mobile station in the above-mentioned terminal-designation-call guidance output state (steps 33 and 34), the control means 5 stops the terminal-designation-call guidance means 9, and transmits an incoming command to the mobile station 3 through the up communication so as to make the control means 20 to drive the send-out means 25 so as to output a ringing tone from the speaker 27 through the amplifier circuit 26. At this time, the send-out means 15 of the base station 2 is not driven so that a ringing tone is not outputted in the base station 2 (steps 33, 41 and 52).

In this state where a ringing tone is being outputted from only the mobile station 3, the control means 5 monitors the response and the call-end time in the mobile station 3 in steps 53 and 54.

If a speech is inputted from the manipulator 28 of the mobile station 3, the control means 20 of the station 3 transmits a speech command to the base station 2 through the down communication, and at the same time disables or stops the send-out means 25 of the station 3 to thereby stop the output of the ringing tone. Having received the speech command, the control means 5 shifts the operation into the speech mode of the station 3 (steps 37, 60 and 61). If there is no response from the station 3 though the call-end time has elapsed, the control means 20 stops the send-out means 25 of the station 3 and drives the response send-out means 23 so as to send out an outgoing message to the circuit through the down communication, the speech circuit 12, the switching contact al and the network connection terminal 1 (steps 54, 55 and 56).

Upon detection of the output from the response send-out means 23 of the station 3 indicating the end of the outgoing message in the outgoing message send-out state of the station 3, the control means 20 drives the message recording means 24 of the station 3 in a step 57 so as to record a caller's message on the recording means 24 through the network connection terminal 1, the switching contact al, the speech circuit 12, and the up communication.

Having received the message recording command in the message recording state of the mobile station 3, the control means 5 of the base station 2 monitors the output of the line disconnect/polarity or detection means 8, and upon detection of the output from the detection means 8 indicating a line disconnect or clearing out, the control means 5 transmits an end command to the station 3 through the up communication, and at the same time turns off the relay Al. Having received the end command, the control means 20 of the station 3 stops the recording means 24, so that the message recording is ended, the circuit is opened, and the control means 5 returns into the state where the existence of a call is detected (steps 58, 59 and 40).

According to the present invention, as is apparent from the above-mentioned first embodiment, a caller can select and call only one of the base station 2 and the mobile station 3, and in absence of the user the message can be recorded in the called station. Accordingly, in the case where users of machines are different from each other between the station 2 and the station 3, it is not necessary for the user of any one of the base and mobile stations to perform troublesome operation, for example, to make a response to the other station or the message of the user of the one station can be prevented from being heard by the user of the other station. Thus, there is an advantage in that a parent-and-child telephone function and an answering function can be effectively used.

Figure 3:
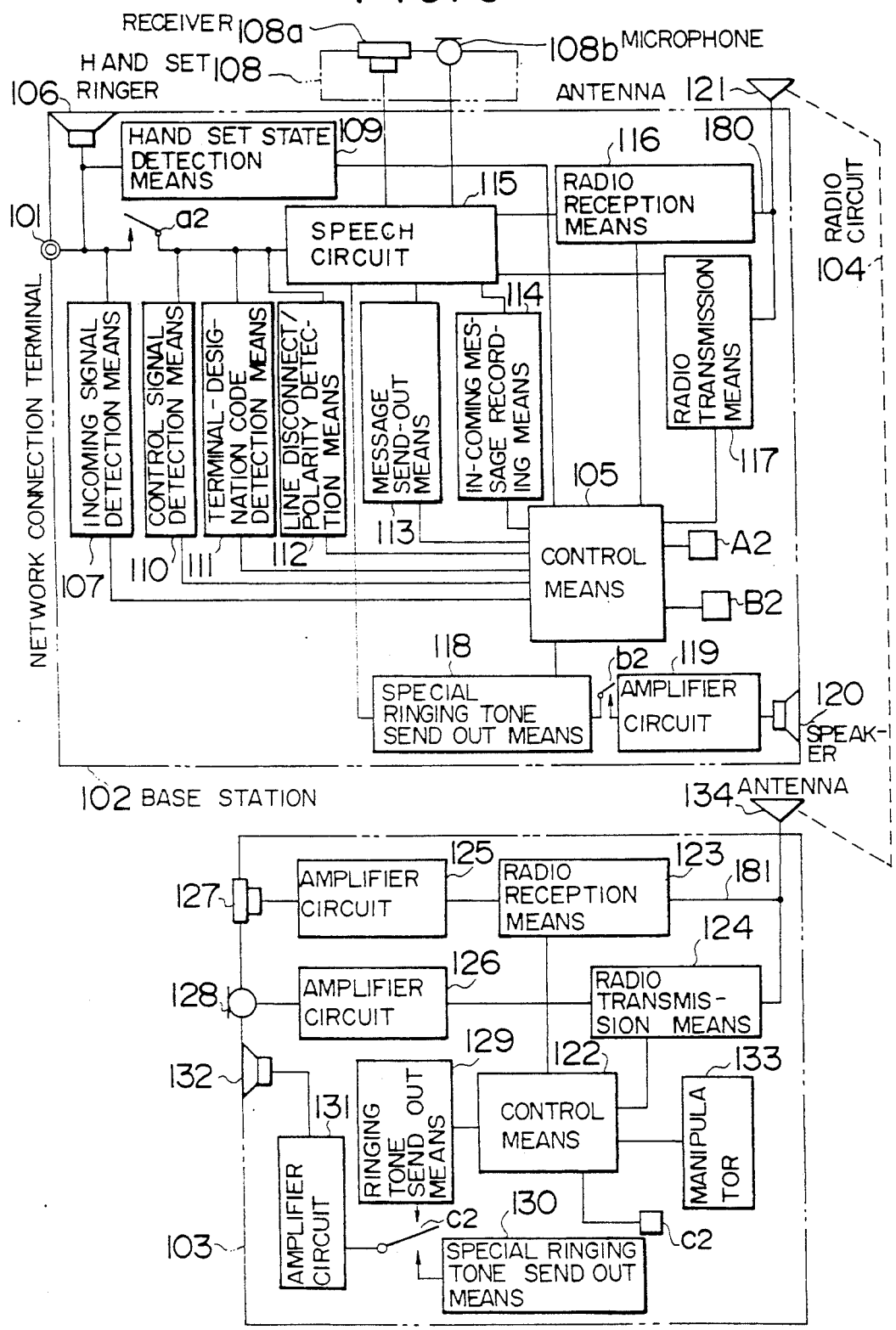
FIG. 3 is a schematic diagram illustrating the configuration of a cordless automatic answering telephone set in a second embodiment of the present invention.

FIG. 3 shows a second embodiment of the automatic answering telephone set according to the present invention. In FIG. 3, the reference numeral 101 represents a network connection terminal for connecting the set to a telephone circuit, 102 represents a base station connected to the telephone circuit through the network connection terminal 101, 103 represents a mobile station to be connected to the base station 102 through a radio circuit 104, 105 represents a control means constituted by a microcomputer for controlling the base station 102, 106 represents a ringer, 107 represents an incoming signal detection means, 108 represents a hand set constituted by a receiver 108a and a microphone 108b, 109 represents a hand-set-state detection means for detecting whether the hand set is off-hooked or not, 110 represents a control signal detection means for detecting a control signal sent from a caller, 111 represents a terminal-designation code detection means for detecting a terminal designation code sent from a caller, 112 represents a line disconnect/polarity (i.e., clearing-out) detection means, 13 represents a response send-out means for sending out an outgoing message, 114 represents an incoming message recording means for recording a caller's message, 115 represents a speech circuit for making a speech with the telephone circuit, 116 represents a radio reception means of the base station 102, 117 represents a radio transmission means of the base station 102, 118 represents a special ringing tone send-out means of the base station 102 for informing that a control signal has been sent from a caller, 119 represents an amplifier circuit, 120 represents a speaker, and 121 represents an antenna of the base station 102.

The reference numeral 122 represents a control means constituted by a microcomputer, 123 represents a radio reception means, 124 represents a radio transmission means, 125 and 126 represent amplifier circuits, 127 represents a receiver, 128 represents a microphone, 129 represents a ringing tone send-out means for informing that an incoming signal has been sent through the telephone circuit, 130 represents a special ringing-tone sending means, 131 represents an amplifier circuit, 132 represents a speaker, 133 represents a manipulator, 134 represents an antenna, A2 represents a relay provided with a switching contact a2 for closing the circuit, and B2 and C2 represent relays respectively provided with switching contacts b2 and c2 for switching the paths of sound signals.

The reception means 116 and the transmission means 117 of the base station 102, and the reception means 123 and the transmission means 124 of the station 103 constitute radio transmission/reception means 180 and 181 for transmitting/receiving controlling data and talking sound signal through the radio circuit 104, respectively.

Figure 4:
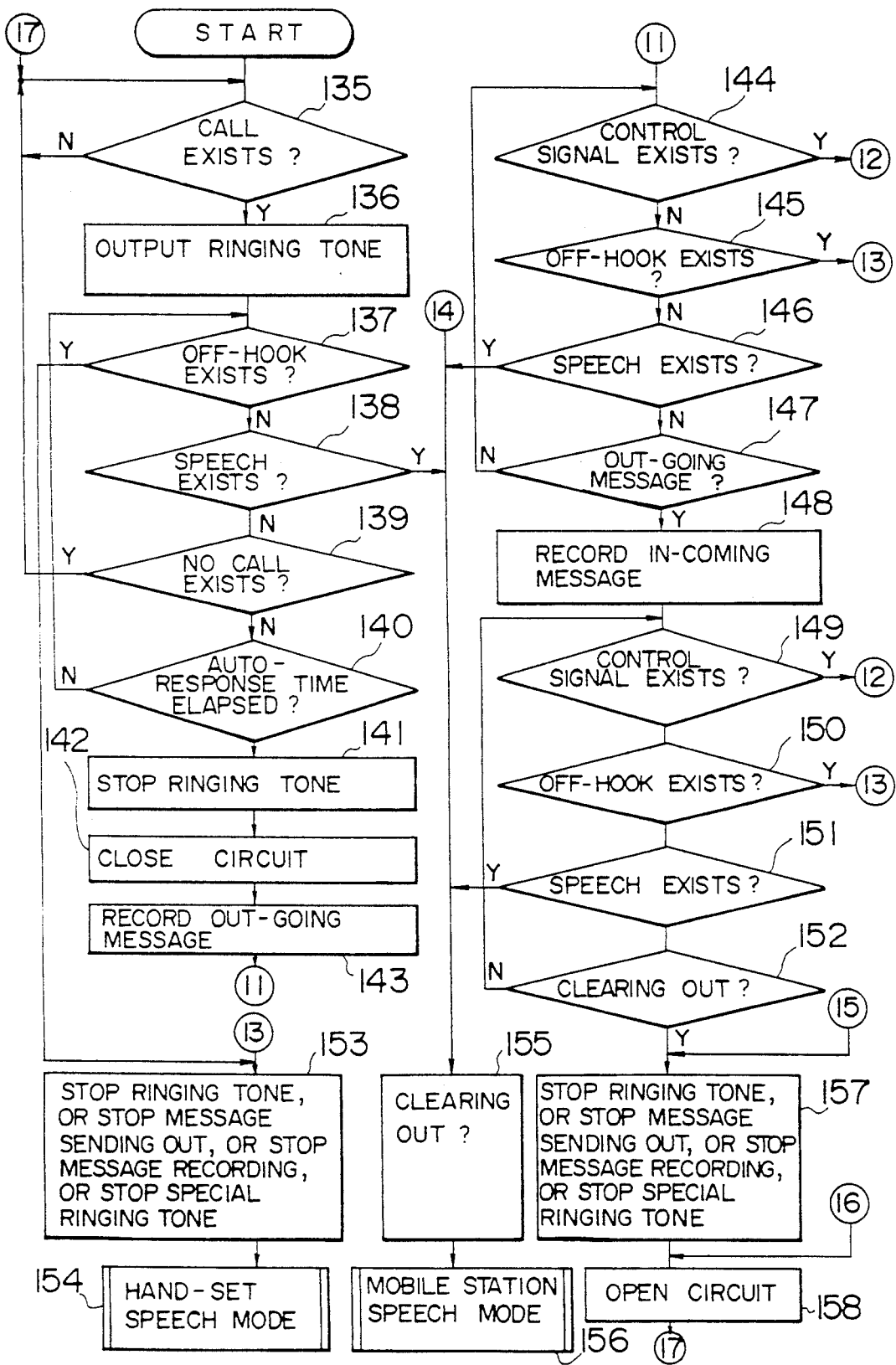
FIGS. 4 and 5 are flow charts showing a main operation of a control means used in the same telephone set.
Figure 5:
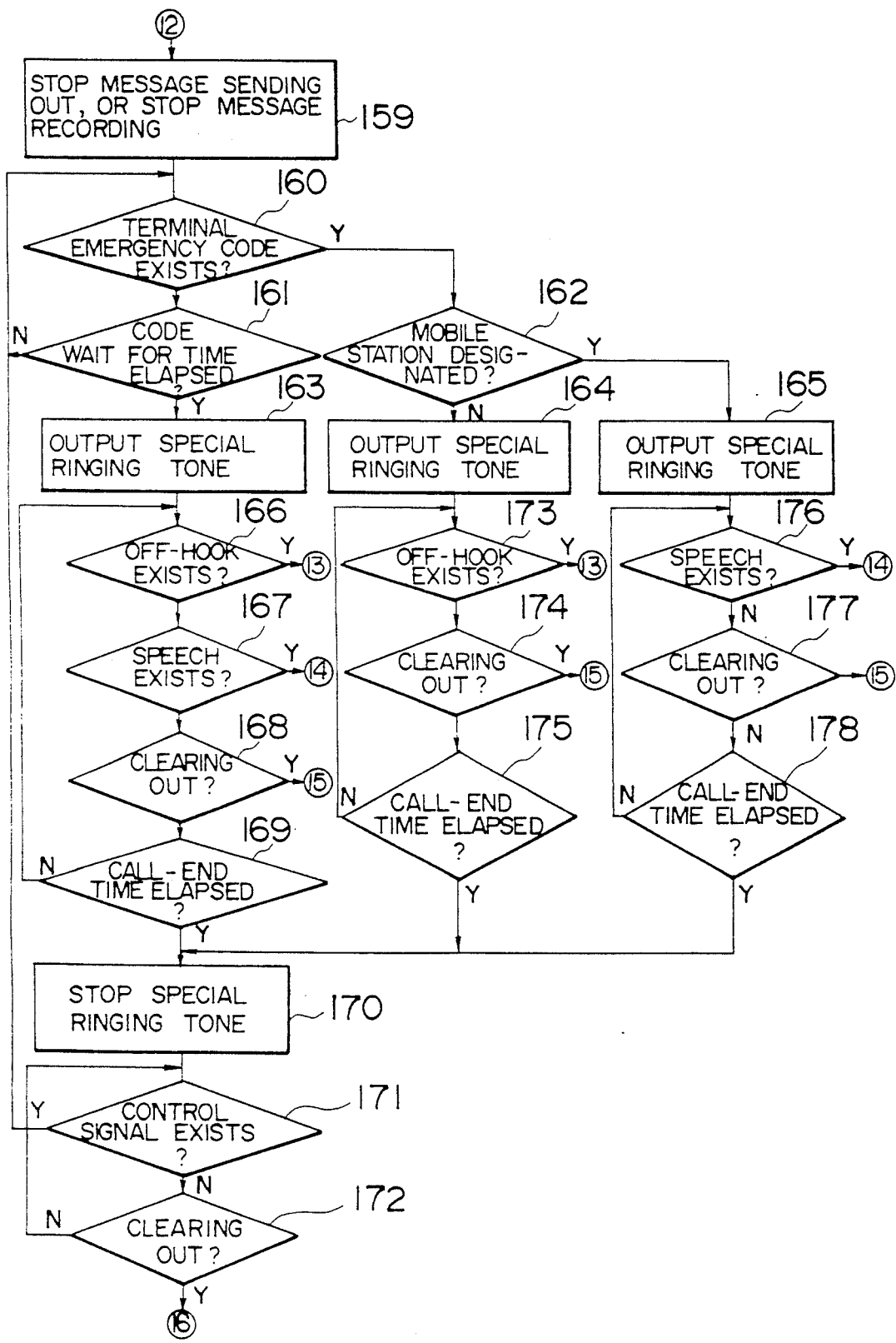

The operation of this embodiment described above will be described hereunder. In the stationary state (the stand-by state) in FIG. 3, the switching contacts a2, b2, and c2 of the respective relays A2, B2, and C3 are in the state as shown in FIG. 3. In this state, when a call is generated through the telephone circuit, the ringer 106 rings, the call is detected by the incoming signal detection means 107, and an output signal indicating the calling state is supplied to the control means 105. In this case, the programs of steps 135-178 corresponding to the flow charts shown in FIGS. 4 and 5 are stored in the control means 105 so that the procedures according to the flow charts are performed. Upon detection of an input signal indicating the calling state of the incoming signal detection means 107 in the step 135, the control means 105 drives the reception means 116 and the transmission means 117 in the step 136 so that an incoming command indicating the existence of the incoming signal is sent to the station 103. The incoming command is supplied to the control means 122 of the station 103 through the transmission means 117, the antenna 121, the radio circuit 104, the antenna 134, and the reception means 123. (Hereinafter, this communication path is referred to as "an up communication path.") Upon detection of the incoming command from the reception means 123, the control means 122 drives the send-out means 129 so that the ringing tone signal is generated from the send-out means 129 through the amplifier circuit 131 and the speaker 132 and a ringing tone is send out.

In the ringing tone sending-out state, the control means 105 monitors a response in the base station 102, a response in the station 103, the end of a call, and the automatic response time, in the steps 137, 138, 139, and 140 respectively. That is, upon detection of an output indicating off-hook from the hand-set state detection means 109, the control means 105 shifts the operation into a hand-set speech mode of the base station 102, and transmits an end command indicating the termina-tion of operation to the control means 122 through the up communication path. Upon reception of the end command, the control means 122 stops the send-out means 129 to thereby stop the sending out of the ringing tone (the steps 137, 153, and 154).

When an input of speech is produced from the manipulator 133 of the mobile station 103, the control means 122 of the mobile station 103 transmits a speech command indicating the existence of speech so as to stop the ringing tone send-out means 129 to stop the sending out of the ringing tone. The speech command is supplied to the control means 105 of the base station 102 through the transmission means 124, the antenna 134, the radio circuit 104, the antenna 121, and the reception means 116 (hereinafter, this communication path is referred to as "a down communication path"). Upon reception of the communication command through the down communication path, the control means 105 turns the relay A2 on so as to close the circuit, so that the operation is shifted into a speech mode of the mobile station 103 (the steps 138, 155, and 156).

In the hand-set speech mode, a voice signal sent through the telephone circuit is supplied to the receiver 108a through the connection terminal 101, the switching contact a2, and the speech circuit 115, while the voice produced from the microphone 108b is sent onto the telephone circuit through the speech circuit 115, the switching contact a2, and the network connection terminal 101, thereby making speech possible.

In the mobile-station speech mode, the voice signal sent from the telephone circuit is supplied to the receiver 127 through the connection terminal 101, the switching contact a2, the speech circuit 115, the up communication path, and the amplifier circuit 125, while the voice produced from the microphone 128 is sent to the telephone circuit through the amplifier circuit 126, the down communication path, the speech circuit 115, the switching contact a2, and the connection terminal 101, thereby making the speech possible.

In the step 139, upon detection of disappearing of the output indicating the calling state, the control means 105 transmits an end command to the mobile station 103. Having reception of the end command through the up communication path, the control means 122 stops the ringing tone send-out means 129 so as to stop the sending out of the ringing tone.

Upon detection of the passage of an automatic response time in the step 140, the control means 105 transmits the end command through the up communication path in the step 141 to thereby stop the sending out of the ringing tone, turns the relay A2 on in the step 142 to thereby close the circuit, and drives the response send-out means 113 in the step 143 so as to send out an outgoing message onto the telephone circuit through the speech circuit 115, the switching contact a2, and the connection terminal 101.

In the outgoing message sending state, the control means 105 monitors the output of the control signal detection means 110, the response in the base station 102, the response in the mobile station 103, and the outgoing message, in the steps 144, 145, 146, and 147 respectively. Upon detection of the output indicating the termination of the outgoing message from the response send-out means 113 in the step 147, the control means 105 drives the message recording means 114 so as to record the message of a caller in the message recording means 114 through the connection terminal 101, the switching contact a2, and the speech circuit 115.

In the message recording state, the control means 105 monitors the output of the control signal detection means 110, the response in the base station 102, the response in the mobile station 103, and the line disconnect/polarity detection means 112, in the steps 149, 150, 151, and 152 respectively. Upon detection of the output signal indicating the clearing-out from the detection means 112 in the step 152, the control means 105 stops the message recording means 114 in the step 157 and turns the relay A2 off in the step 158, so that the message recording is ended, and the operation is returned to the stationary state in which the telephone circuit is opened and the existence of a call is detected.

If there exists the off-hook of the hand set 108 or an input of speech from the manipulator 133 while the outgoing message is being sent or while the incoming message is being recorded, the operation is shifted into the speech mode after the respective operations are finished similarly to the ringing tone producing state.

If a control signal, for example, a DTMF signal, is sent from a caller while the outgoing message is being sent (or while the incoming message is being recorded), the control signal is detected by the control signal detection means 110, and an output signal indicating the existence of the control signal is supplied to the control means 105 and the terminal-designation code detection means 111. Upon detection of the output signal indicating the existence of the control signal of the control signal detection means 110 in the step 144 (or in the step 149), the control means 105 stops the response send-out means 113 (or the incoming message recording means 114) in the step 159, and monitors the output signal of the detection means 111 in the steps 160 and 161. Upon detection of the output signal indicating the existence of the control signal of the detection means 110, the detection means 111 starts the detection of a terminal-designation code sent from a caller. Upon detection of the terminal-designation code, the detection means 111 supplies the terminal-designation code to the control means 105.

In the case where the terminal-designation code is not supplied from the detection means 111 to the control means 105 even after the terminal-designation code input waiting time has elapsed, in the step 163, the control means 105 drives the special ringing tone send-out means 118 to turn the relay B2 on so as to output a special ringing tone from the base station 102 through the amplifier circuit 119 and the speaker 120, sends out the special ringing tone onto the telephone circuit through the speech circuit 115, the switching contact a2, and the network connection terminal 101, and at the same time transmits a special ringing command for outputting the special ringing tone to the control means 122 through the up communication path. Upon reception of the special ringing command, the control means 122 drives the special ringing tone send-out means 129 so as to turn the relay C2 on so that the special ringing tone is outputted from the mobile station 103 through the amplifier circuit 131 and the speaker 132.

Further, upon detection of the terminal-designation code indicating the selection of the base station 102, the control means 105 drives the special ringing tone send-out means 119 so as to turn the relay B2 to thereby output the special ringing tone to the base station 102 and the telephone circuit (the steps 160, 162, and 164). Upon detection of the terminal-designation code indicating the selection of the mobile station 103, on the other hand, the control means 105 drives the special ringing-tone send-out means 118 to thereby send out the special ringing tone onto the telephone circuit and at the same time transmits the special ringing command to the control means 122. In this case, the control means 122 turns the relay C2 on so that the special ringing tone is sent out from the special ringing tone send-out means 130 through the amplifier circuit 131 and the speaker 132 (the steps 160, 162, and 165).

In the case where both the base station 102 and the mobile station 103 are outputting the special ringing tones in the special ringing tone output state, the control means 105 monitors the response in the base station 102, the response in the mobile station 103, the output of the line disconnect/polarity detection means 112, and the lapse of the special ringing tone stoppage time, in the steps 166, 167, 168, and 169 respectively. In the case where only the base station 102 is outputting the special ringing tone, the control means 105 monitors the response in the base station 102, the output of the detection means 112, and the lapse of the special ringing tone stoppage time, in the steps 173, 174, and 175 respectively. On the other hand, in the case where only the mobile station 103 is outputting the special ringing tone, the control means 105 monitors the response in the mobile station 103, the output of the detection means 112, and the lapse of the special ringing tone stoppage time, in the steps 176, 177, and 178 respectively.

Upon detection of the lapse of the special ringing tone stoppage time in the case where both the base station 102 and the mobile station 103 are producing the special ringing tone (step 169), the control means 105 disables or stops the special ringing tone send-out means 118 and turns the relay B2 off in the step 170 to thereby stop the outputting of the special ringing tone from the base station 102 and sending out the special ringing tone to the telephone circuit, and at the same time the control means 105 transmits the end command to the control means 122 through the up communication path. Upon reception of the end command, the control means 122 stops the special ringing tone send-out means 129 and turns the relay C2 off so as to stop the outputting of the special ringing tone from the mobile station 103.

Further, upon detection of the lapse of the special ringing tone stoppage time in the case where only the base station 102 is outputting the special ringing tone (step 175), the control means 105 disables or stops the special ringing tone send-out means 118 and turns the relay B2 off in the step 170 so as to stop the outputting of the special ringing tone from the base station 102 and the sending out of the special ringing tone onto the telephone circuit. In the case where only the mobile station 103 is outputting the special ringing tone (step 178), the control means 105 stops the send-out means 118 in the step 170 so as to stop the sending out of the special ringing tone onto the telephone circuit, and at the same time the control means 105 transmits the end command to the control means 122 so as to stop the outputting of the special ringing tone from the mobile station 103.

As described above, when the control means 105 detects the lapse of the special ringing tone stoppage time and terminates the special call, the operation is shifted into the control signal acceptance mode in which a control signal can be accepted and the control means 105 monitors the respective outputs of the control signal detection means 110 and the line disconnect-/polarity detection means 112 (steps 171, 172).

On the other hand, upon detection of the offhook of the hand set 108 (step 166 or 173), the control means 105 stops the special ringing tone and makes the hand set speech of the base station 102 possible in the steps 153 and 154. Upon reception of the speech command from the control means 122 (step 167 or 176), the control means 105 stops the special ringing tone so that speech can be performed in the mobile station 103 in the steps 155 and 156. Further, upon detection of clearing-out (i.e., line disconnect) (steps 169, 174, and 177), the control means 105 stops the special ringing tone so as to open the telephone circuit in the steps 157 and 158, and the operation is returned to the stationary state in which the existence of a call is detected.

As being apparent from the second embodiment as described above, the present invention has such an effect that a caller can select the output of the special ringing tone from the base station and/or the mobile station, so that users of a cordless automatic answering telephone set can sufficiently effectively utilize a selectively responding function in which only a special person can make a response even in the case where the users are different from each other between the base station and the mobile station.

We claim:

1. A cordless automatic answering telephone set comprising, as a terminal, a base station connected to a telephone circuit and a mobile station connected to said base station through a radio circuit, in which said base station includes: control signal detection means for detecting a control signal sent from a caller; terminal-designation code detection means for detecting a terminal designation code sent from said caller after detection of said control signal; special ringing tone send-out means for sending out a special ringing tone; and control means connected to said control signal detection means, said terminal-designation code detection means, and said special ringing tone send-out means;

in which said mobile station includes special ringing tone send-out means for sending out ringing tone;

whereby said control means selects said special ringing tone send-out means of either one of said base station and said mobile station in accordance with the control signal and terminal designation code sent from the caller to said base station.

2. A cordless automatic answering telephone set comprising, as a terminal, a base station connected to a telephone circuit and a mobile station connected to said station through a radio circuit, in which said base station includes: radio transmission/reception means for performing transmission/reception of control data and a speech voice signal between said base and mobile stations through a radio circuit; response send-out means for sending out an outgoing message in response to a call from a caller; an incoming message recording means for recording a caller's message control signal detection means for detecting a control signal sent from the caller; terminal-designation code detection means for detecting a terminal designation code sent from said caller after detection of said control signal; special ringing tone send-out means for sending out a special ringing tone on the basis of a output signal of said control signal detection means and an output signal of said terminal-designation code detection means; and control means connected to said radio transmission/reception means, said response send-out means, said incoming recording means, said control signal detection means, said terminal-designation code detection means, and said special ringing tone send-out means;

in which said mobile station includes radio transmission/reception means for performing transmission/reception of the control data and the speech voice signal between said base and mobile stations through said radio circuit, and special ringing tone send-out means for sending out a special ringing tone;

whereby said control means selects either one of said base station and said mobile station in accordance with the control signal and terminal designation code sent from the caller to said base station drives the special ringing tone send-out means of the selected one of said base station and said mobile station.

3. A cordless automatic answering telephone set according to claim 1, in which the control signal is a DTMF signal.

4. A cordless automatic answering telephone set according to claim 2, in which the control signal is a DTMF signal.

* * * * *